United States Patent

[11] 3,597,920

[72] Inventor Harold A. Wadman
 West Hartford, Conn.
[21] Appl. No. 851,817
[22] Filed Aug. 21, 1969
[45] Patented Aug. 10, 1971
[73] Assignee Chandler Evans Inc.
 West Hartford, Conn.

[54] TURBINE INLET TEMPERATURE SENSOR AND COMPUTER
 10 Claims, 1 Drawing Fig.
[52] U.S. Cl. .................................................. 60/39.52,
 60/39.51 R, 73/346, 73/349
[51] Int. Cl. .................................................. G01k 5/50,
 G01k 13/02, F02c 7/10
[50] Field of Search ........................................ 73/349,
 190, 343, 339, 346; 60/39.51, 39.52

[56] References Cited
 UNITED STATES PATENTS
 2,864,237 12/1958 Coleman ..................... 60/39.51
 3,043,106 7/1962 Coleman ..................... 60/39.51

Primary Examiner—Louis R. Prince
Assistant Examiner—Denis E. Corr
Attorney—Radford W. Luther ABSTRACT: A device for measuring the temperature of hot gases from a gas turbine burner section having a first duct which introduces the gases to a heat exchanger which cools the gases by means of air circulated from a high-pressure stage of a compressor to a low-pressure stage of the compressor and two spaced temperature probes downstream of the exchanger. A second duct interconnects the first duct portion upstream of the heat exchanger and a first duct portion intermediate the temperature probes. The outlet of the first duct portion, downstream of the second temperature probe, also communicates with the compressor section so as to establish a pressure differential between the inlet and outlet of the device. A mechanical linkage is pivotably secured to the outputs of the two temperature probes and yields a reading that is proportional to the temperature of the hot gases.

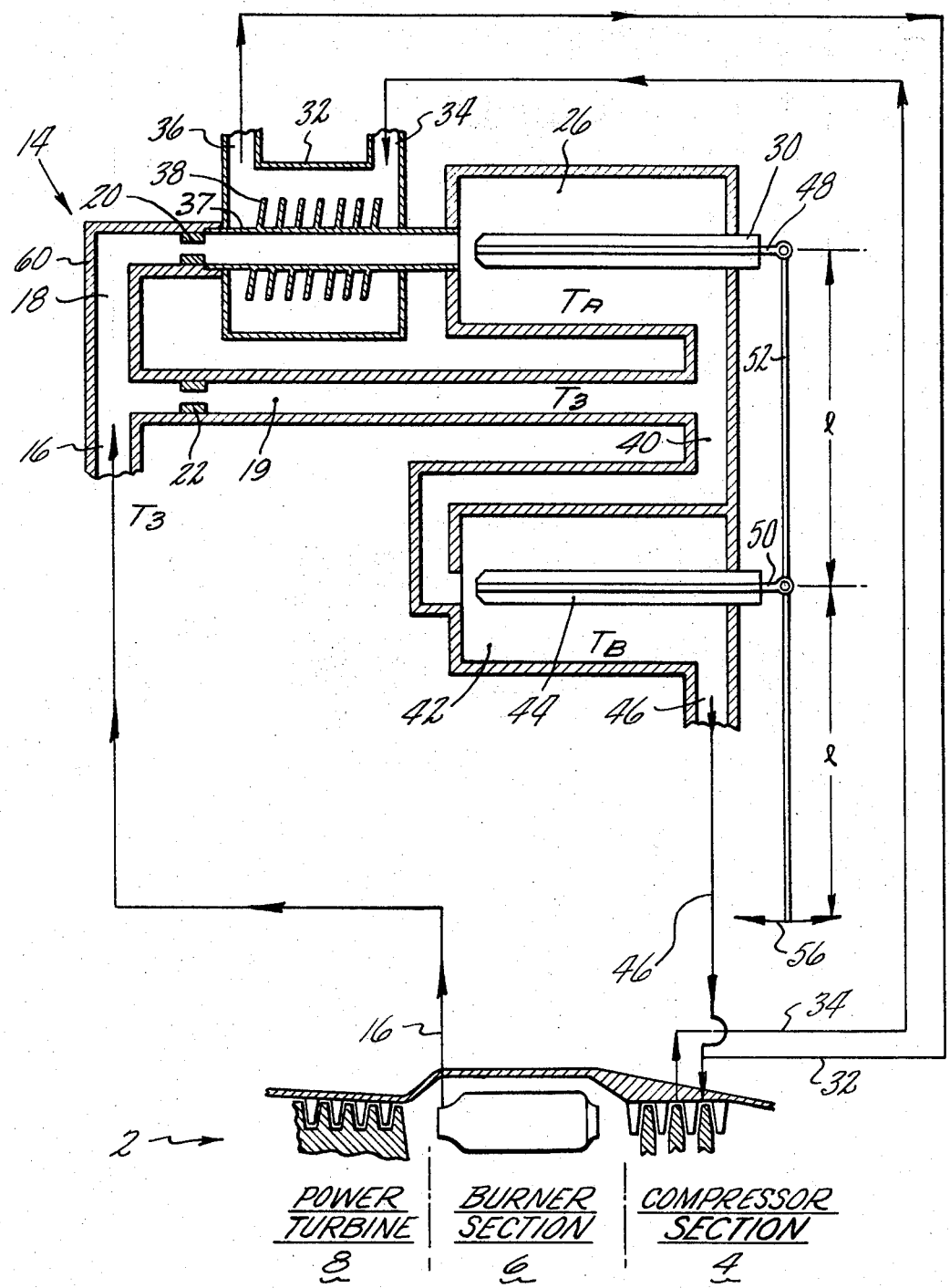
INVENTOR
HAROLD A. WADMAN
BY Radford W. Luther
ATTORNEY

TURBINE INLET TEMPERATURE SENSOR AND COMPUTER

BACKGROUND OF THE INVENTION

The present invention relates generally to temperature measurement and more particularly to the measurement of extremely high gas temperatures which are not susceptible to direct measurement.

The present invention further relates to the measurement of high gas temperatures in power plants and even more particularly to temperature measurements in gas turbine engines. The invention also concerns gas turbine engine control systems in which the power turbine inlet temperature is a parameter in the control of the engine.

The accurate measurement of high gas temperatures has always been a difficult problem of such a nature as not to admit of facile solutions. Frequent applications require the temperature-sensitive element to stand up under both oxidizing and reducing atmospheres and to have a rapid rate of response to temperature transients. A temperature-measuring device which is incorporated as an element in an engine control system must also have a sufficiently long service life so as to be capable of continuous operation without overhaul for long operational time periods.

Devices for measuring the temperatures in aircraft engines should be of low weight and simple in construction and operation. Such devices should also be compact and hence capable of inclusion in systems where space is at a premium.

Accurate temperature measurement of combustion chamber temperatures in a turboprop engine if of particular importance since safe operation is dependent upon the rigorous exercise of control over these temperatures. If the combustion chamber temperatures exceed certain specified limits, serious damage may result to the engine and the aircraft in which it is installed. The gas temperatures which have to be measured in typical turboprop installations approach a maximum limit of the order of 2,500° F.

Previously optical pyrometers or radiation pyrometers have been utilized to measure the temperatures of a gaseous medium of an astronomical diameter. These pyrometers are, however, not readily adaptable for operational use in aircraft power plant application, inasmuch as they must measure the temperature of a surface heated by the gas therein, and this temperature does not invariably equal that of the gas.

One prior art solution to the problem of hot gas temperature measurement involves passing the hot gas through two orifices of known coefficients. Heated gas is passed through a first orifice, and then passed through a second orifice. A constant differential pressure drop is maintained across the second orifice by a proportional flow regulator. Also, a constant relationship between the gas temperature at the second orifice, and the square of the effective orifice areas is maintained by means of a bimetallic strip and tapered plug arrangement. The measured pressure drop across the first orifice is then indicative of the hot gas temperature. While this system yields an acceptable response rate, it is complicated and expensive.

U.S. Pat. No. 3,181,361 also addresses itself to the problem of hot gas temperature measurement. The aforementioned patent discloses a calorimetric temperature measuring device which utilizes a mixing chamber in which hot and cool gases commingle. Enthalpy computations and pressure determinations are required to determine the temperature of the hot gas.

Another device in point is a hot-blast pyrometer, disclosed in *Engineering News*, Nov. 14, 1895, at pages 323—324, which is used for measuring the temperature of the blast in a hot-blast iron furnace. This device consists essentially of a hot-blast inlet duct and an air inlet duct, both of which communicate with a third duct, through which flows a mixed current of air and hot blast. To this third duct is attached a temperature-measuring device which indicates the temperature of the mixed current and also the temperature of the hot blast. A notable deficiency, inherent in this type of arrangement, is that the aspiration of cooling air further aggravates the oxidizing atmosphere presented to the temperature-measuring device, thus compounding an already critical problem.

SUMMARY OF THE INVENTION

Briefly stated, a hot gas of unknown temperature is passed through a bifurcated conduit. One leg of the conduit passes through a heat exchanger and rejoins the other leg. Temperature measurements are respectively made between the heat exchanger and the point of rejoinder and downstream of the point of rejoinder. The temperature of the hot gas can be computed solely from the temperature measurements and the amount of heat withdrawn by the heat exchanger is immaterial.

The theory of operation of a device in accordance with the instant invention is as follows (see FIG. 1): gas, the temperature of which is unknown, is introduced into parallel conduits, the mass flow rates through which are fixed at a known ration "K." The gas flowing through one conduit is cool significantly by a heat exchanger and its temperature directly measured by a state-of-the-art sensor. The measured gas is then mixed with the hot gas delivered by the parallel conduit and the mixture temperature directly measured, again by a state-of-the-art sensor. If the cooled conduit delivers mass flow at a rate $M_A$ and temperature $T_A$ and the parallel conduit provides a mass flow rate $M_3$ at unknown temperature $T_3$, the ratio K of $M_A$ to $M_3$ being known since orifices of known characteristics can be placed in the entrance to each conduit, and the temperature of the mixture $T_B$, which has a mass flow rate $M_A+M_3$, is known, then $T_3$ can be computed by the following equations, assuming no heat loss except by way of the heat exchanger, wherein:

$Q_A$ = heat leaving heat exchanger in the primary flow stream in a parallel conduit (not the heat leaving in the cooling flow through the exchanger);
$Q_3$ = heat leaving the other parallel conduit;
$Q_B$ = heat leaving the device in the mixture;
$M_A$ = mass rate of flow in said parallel conduit;
$M_3$ = mass rate of flow in said other parallel conduit;
$M_B$ = mass rate of flow of mixed gas leaving the device;
$T_A$ = temperature of gas leaving heat exchanger in primary flow stream;
$T_3$ = unknown temperature of gas entering device and flowing through said other parallel conduit;
$T_B$ = temperature of mixed gas leaving the device;
$K = M_A/M_3$ Referring to FIG. 1 and assuming steady-state condition, it is obvious that:

$$Q_A + Q_3 = Q_B \quad (1)$$

Since $Q_A = M_A T_A$, $Q_3 = M_3 T_3$, and $Q_B = M_B T_B$, equation (1) can be rewritten as follows:

$$M_A T_A + M_3 T_3 = (M_A + M_3) T_B \quad (2)$$

Solving for $T_3$:

$$T_3 = \frac{(M_A + M_3) T_B - M_A T_A}{M_3} \quad (3)$$

Now, since $K = M_A/M_3$, equation (3) can be rewritten as follows:

$$T_3 = K T_B + T_B - K T_A \quad (4)$$

Assuming that the parallel channels can be made identical, i.e., provided with equal orifices and friction paths, then:

$$M_A = M_3 \quad (5)$$

and therefore:

$$K = 1 \quad (6)$$

Equating K to unity equation (4) becomes:

$$T_3 = 2 T_B - T_A \quad (7)$$

As is evident from the above relationships, a device according to the instant invention is insensitive to variations in the heat exchanger's heat transfer coefficient.

The present invention provides a compact temperature-measuring device which is capable of accurately measuring high gas temperatures for a prolonged period of time, and yet is simple in construction and operation.

The device is also advantageous since it is closed to its surrounding environment, thereby alleviating the harsh effects of an oxidizing atmosphere presented to a temperature sensor.

A primary object of my invention is to provide a relatively compact temperature-measuring device for accurately measuring the temperature of hot gases.

Another object of the present invention is to provide a temperature-measuring device that has a long service life and requires minimum maintenance.

A further object is to provide a temperature sensor embodying a heat exchanger which provides accurate temperature measurements regardless of the rate of heat transfer by the exchanger.

A still further object is to provide a temperature measuring device which is isolated from its environment so as to minimize the harmful effects that are caused by an oxidizing atmosphere contacting a temperature sensor.

These and other objects and advantages will become more readily apparent when taken in conjunction with the following detailed description and accompanying drawings.

BRIEF DESCRIPTION OF THE DRAWING

The drawing is a schematic view of a turbine inlet temperature computer according to the invention along with its flow relationship to a turbine engine.

DETAILED DESCRIPTION OF THE PREFERRED EMBODIMENT

Turning now to the drawing, there is shown a conventional gas turbine engine generally indicated at 2, which includes a three-stage compressor section 4, a burner section 6 and a power turbine 8. Turbine engine 2 has a fluid communicating conduit (not shown), so arranged as to provide passage of hot gas from the burner discharge 13 or power turbine inlet sections to a temperature-sensing computer, shown generally at 14. The temperature-measuring arrangement shown in the drawing also includes further conduits associated with the temperature computer, which are fluidly connected with the various stages of the compressor section, as is ore fully explained hereinafter.

The computer 14 receives a hot flow of gas from the burner discharge 13 via the communicating conduit and computer inlet conduit 16 which bifurcates into a first passage or duct 18 and a second passage or duct 19. Passages 18 and 19 contain respective orifices 20 and 22 made of a suitable refractory material, such as alumina or zirconia stabilized with lime or rare earth. Alternatively, platinum or platinum-rhodium could serve as an orifice material. Passage 18 includes an enlarged segment which forms a chamber 26, which has a bimetallic temperature-measuring device of the probe type 30 mounted therein for producing a displacement signal proportional to $T_A$. The temperature-measuring devices may employ a tungsten rod in an outer tube of dispersed thorium oxide in nickel with some chromium added. In a slightly less preferred version, the tungsten rod could be replaced by a molybdenum rod. If the computer is not to be subjected to vibration, the tungsten rod could also be replaced by a more brittle silicon carbide rod.

Passage 18 passes through a heat exchanger 32 which is adapted to cool the hot gas flowing in the passage by means of a cooling air flow bled from a high-pressure stage of the compressor section 4 and fluidly communicated to heat exchanger inlet passage 34 by suitably conduit (not shown). The cooling airflow is returned to a low-pressure stage of the compressor section 4 by means of heat exchanger outlet passage 36, the flow in which is fluidly communicated to the first stage of compressor section 4 by another conduit (not shown). This cooling circuit may utilize stainless steel tubing leading to and from a platinum tube section 37 having platinum fins 38 thereon, only the platinum sections being in contact with the high-temperature oxidizing atmosphere.

Passages 18 and 19 reunite in a third passage 40, which includes a chamber 42, having a temperature-measuring device 44 mounted therein to measure the temperature $T_B$ of the intermixture of flows. The construction of device 44 is preferably identical to that of device 30, although dissimilar probes could be utilized. passage 40 terminates in a computer outlet port 46, the flow from which is fluidly communicated to a low-pressure stage of the compressor section 4 to provide a motive differential.

Both of the temperature-measuring probes 30 and 44 have output members respectively shown at 48 and 50, which are pivotably connected to a linkage arm 52, the free end of which provides a displacement signal at free end 56 proportional to the turbine inlet temperature $T_3$ ($T_3=2T_B-T_A$), the arm segment lengths "1" being equal. It will be understood that the mechanical computer linkage device illustrated could be readily replaced by an electrical device. It should also be noted that the response time of the temperature computer may be altered during periods of rapid temperature rise by situating a mass of material having a high specific heat in either passage 18 upstream of probe 30, or passages 19 or 40, depending upon whether a transient computed undershoot or overshoot is desired.

It is apparent that accurate operation of this device requires heat losses through the passage walls to be negligible with respect to the flow rate. Therefore, the passages must be of the minimum lengths that are consistent with good mixing of hot and cooled gases. An insulator for the conduits and passages should exhibit a low specific heat and a low conductivity. A preferred material for the insulation 60 is lime stabilized zirconium oxide. A preferred construction for the passages and conduits comprises two spaced concentric tubes, the outer and inner tubes being respectively made of ICONEL-X and a platinum-rhodium alloy, the annulus between the tubes being packed with zirconium oxide.

An alternate construction is to jacket inlet conduit 16, passages 19 and 40, and the chambers 26 and 42 with outer and inner gas mixtures maintained at the same temperature by suitable means so as to negate a heat flow therefrom.

In operation inlet conduit receives a flow of hot gas, at temperature $T_3$, from the burner discharge section 13. The flow is then divided between passages 18 and 19, the flow $M_A$ in passage 18 being cooled by heat exchanger 32. The cooling flow in the heat exchanger is derived from a high-pressure stage (e.g., a second stage) of compressor 4 and returned to a low-pressure stage (e.g., a first stage). The cooled flow $M_A$ is passage 18 then enters chamber 26 where its temperature $T_A$ is measured by probe 30, the output member thereof assuming a displacement consonant with the temperature $T_A$. The flow leaving chamber 26 then merges with the flow $M_3$ in passage 19 which is at a temperature $T_3$. The merges flow $M_B$ in passage 40 enters chamber 42 where its temperature $T_B$ is measured by probe 44, which accordingly effects a displacement of output member 50. The flow leaves passage 40 through outlet port 46 and is directed to the third stage compressor 4, which is at a lower pressure than the burner discharge section 13. The motive differential for the primary fluid flow through computer 14 is therefore the differential pressure between the burner discharge 13 and the low-pressure stage of compressor 4. The free end 56 of arm 52 is displaced by probe output members 48 and 50 a distance which is proportional to the value of the temperature $T_3$.

Obviously, in other applications of the temperature computer, a suitable alternate provision must be made to supply external cooling flow to the heat exchanger and to apply a flow causing pressure differential to the fluid whose temperature is to be sensed.

By the term "chamber," as used in the claims, is meant that portion of a passage which contains or is associated with a temperature-measuring device. Also, the terms "high" and "low," as applied to describe the stages of the compressor section in the specification and claims, are intended to be relative terms and are not to be construed as denoting particular stages such as the first, second, third, etc.

While I have described what I regard as the preferred embodiment of my invention, it will be understood that the details of construction may be varied within wide limits without departure from the scope or spirit of the invention.

I claim:

1. A temperature-sensing device comprising an inlet conduit for introducing a fluid of unknown temperature into said device, a first passage having a chamber therein, said first passage fluidly communicating with said inlet conduit, a heat exhanger operatively connected to said first passage to reduce the temperature of fluid in said first passage before entering said first passage chamber, a second passage fluidly communicating with said inlet conduit, a third passage, having a chamber therein, fluidly communicating with said first and second passages for effecting an intermixture of flows from said first passage chamber and said second passage, said third passage serving to communicate said intermixture of flows to said third passage chamber and two temperature-measuring devices respectively associated with said chambers to measure the temperature in each of said chambers.

2. A temperature-sensing device, as defined in claim 1, in which a temperature-computing device is operatively connected to said temperature-measuring devices to indicate the unknown temperature of said fluid.

3. A temperature-sensing device, as defined in claim 1, in which there is further provided a turbine engine that includes a compressor section with a low-pressure stage and a high-pressure stage, and means fluidly interconnecting said high-pressure stage and said heat exchanger to bleed a cooling inlet airflow for said heat exchanger.

4. A temperature-sensing device, as defined in claim 3, in which said heat exchanger comprises an outlet passage which fluidly communicates with said low-Pressure stage.

5. A temperature-sensing device, as defined in claim 4, in which said turbine engine further includes a burner section mounted forward of said compressor section, and in which means are provided to fluidly interconnect said burner section and said first passage.

6. A temperature-sensing device, as defined in claim 1, in which one of said temperature-measuring devices comprises a bimetallic probe located in one of said chambers.

7. A temperature-sensing device, as defined in claim 6, in which the other temperature-measuring device comprises a bimetallic probe located in the other of said chambers.

8. A temperature-sensing device, as defined in claim 7, in which said bimetallic probes each includes an output member, and in which a linkage arm is connected to said output members to indicate the temperature of said fluid of unknown temperature.

9. In combination with a gas turbine engine including a compressor section with low-pressure stage and a high-pressure stage, a burner section and a power turbine output section, a temperature-sensing device for measuring power turbine inlet temperatures, said temperature-sensing device comprising a duct to receive a gas from said burner section and an outlet port for discharge of said gas, a heat exchanger operatively associated with said duct including an inlet passage and an outlet passage, said exchanger cooling the gas received by said duct of said device said inlet passage fluidly communicating with said high-pressure stage for receiving a cooling flow therefrom and means responsive to the temperature of the gas cooled by said heat exchanger for indicating said power turbine inlet temperatures.

10. The combination, according to claim 9, wherein said low-pressure stage is in fluid communication with said outlet port to thereby provide a pressure differential between said burner section and said outlet port for producing a flow of said gas through said device.